US012731914B2

(12) United States Patent
Choi et al.

(10) Patent No.: US 12,731,914 B2
(45) Date of Patent: Sep. 8, 2026

(54) ELECTRONIC DEVICE INCLUDING ANTENNA ARRAY

(71) Applicant: SAMSUNG ELECTRONICS CO., LTD., Suwon-si (KR)

(72) Inventors: Dooseok Choi, Suwon-si (KR); Kyeol Kwon, Suwon-si (KR); Youngki Lee, Suwon-si (KR); Dongkwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 301 days.

(21) Appl. No.: 18/511,376

(22) Filed: Nov. 16, 2023

(65) Prior Publication Data

US 2024/0347931 A1 Oct. 17, 2024

(30) Foreign Application Priority Data

Apr. 17, 2023 (KR) ........................ 10-2023-0050336

(51) Int. Cl.

*H01Q 21/29* (2006.01)
*H01Q 3/06* (2006.01)
*H01Q 21/08* (2006.01)

(52) U.S. Cl.

CPC ............. *H01Q 21/293* (2013.01); *H01Q 3/06* (2013.01); *H01Q 21/08* (2013.01)

(58) Field of Classification Search

USPC .......................................................... 343/702
See application file for complete search history.

(56) References Cited

U.S. PATENT DOCUMENTS 10,468,752 B2 11/2019 Jung et al.
11,115,511 B1 * 9/2021 Ghaemi ............... H04B 7/0602
11,152,713 B2 10/2021 Rodríguez-Cano et al.
2013/0010405 A1 * 1/2013 Rothkopf ............ H04M 1/0268
361/679.01

(Continued)

FOREIGN PATENT DOCUMENTS

CN 109193122 A * 1/2019 ............. H01Q 1/521
KR 10-2020-0007377 A 1/2020

(Continued)

*Primary Examiner* — Dimary S Lopez Cruz
*Assistant Examiner* — Brandon Sean Woods
(74) *Attorney, Agent, or Firm* — Sughrue Mion, PLLC

(57) ABSTRACT

An electronic device includes: a first housing including a first surface and a second surface connected to the first surface and having an area that is smaller than an area of the first surface; a second housing including a third surface and a fourth surface connected to the third surface and having an area that is smaller than an area of the third surface; a hinge structure connecting the first housing and the second housing to be foldable relative to each other at a folding axis between a folded state of the electronic device and an unfolded state of the electronic device; a first antenna array provided at the first surface; and a second antenna array provided at the fourth surface; and a flexible board connecting the first antenna array and the second antenna array, wherein the first antenna array and the second antenna array are configured to form a third antenna array and to form a fourth antenna array, according to whether the electronic device is in the unfolded state or in the folded state.

14 Claims, 14 Drawing Sheets

(56) References Cited

U.S. PATENT DOCUMENTS

| | | | |
|---|---|---|---|
| 2016/0372837 | A1 | 12/2016 | Jung et al. |
| 2019/0214739 | A1 | 7/2019 | Rodríguez-Cano et al. |
| 2020/0021015 | A1 | 1/2020 | Yun et al. |
| 2020/0266519 | A1 | 8/2020 | Lee et al. |
| 2022/0052438 | A1 | 2/2022 | Li |
| 2022/0131281 | A1* | 4/2022 | Shah ...................... H01Q 25/00 |
| 2022/0216591 | A1 | 7/2022 | Sakaida et al. |
| 2022/0393380 | A1 | 12/2022 | Kim et al. |
| 2023/0146643 | A1 | 5/2023 | Jang et al. |

FOREIGN PATENT DOCUMENTS

| | | | |
|---|---|---|---|
| KR | 10-2333388 | B1 | 12/2021 |
| KR | 10-2342852 | B1 | 12/2021 |
| KR | 10-2022-0017320 | A | 2/2022 |
| KR | 10-2022-0163726 | A | 12/2022 |

* cited by examiner

ELECTRONIC DEVICE INCLUDING ANTENNA ARRAY

CROSS-REFERENCE TO RELATED APPLICATION

This application claims priority under 35 U.S.C. § 119 to Korean Patent Application No. 10-2023-0050336, filed on Apr. 17, 2023, in the Korean Intellectual Property Office, the disclosure of which is incorporated by reference herein in its entirety.

BACKGROUND

Embodiments of the present disclosure described herein relate to an electronic device including an antenna array.

Electronic devices may have various shapes due to development of display and circuit technologies. For example, electronic devices having foldable shapes have been developed to increase a convenience of portability.

Further, due to a rapid increase in network traffic by recent electronic devices, 5th generation (5G) new radio (NR) technologies and 6th generation (6G) technologies have been developed. The 5G technology uses frequency range 1 (FR1) and FR2 frequency bands, and among them, FR2 is defined as a frequency band of 6 GHz or more, and in particular, includes a millimeter wave (mmWave) band (about 24 GHz to 100 GHz). An electronic device may utilize an antenna array structure to transmit and receive signals at the millimeter wave band.

SUMMARY

Embodiments of the present disclosure provide an electronic device including an antenna array that may be reconfigured.

According to an aspect of an embodiment, an electronic device includes: a first housing including a first surface and a second surface connected to the first surface and having an area that is smaller than an area of the first surface; a second housing including a third surface and a fourth surface connected to the third surface and having an area that is smaller than an area of the third surface; a hinge structure connecting the first housing and the second housing to be foldable relative to each other at a folding axis between a folded state of the electronic device and an unfolded state of the electronic device; a first antenna array provided at the first surface; and a second antenna array provided at the fourth surface; and a flexible board connecting the first antenna array and the second antenna array, wherein the first antenna array and the second antenna array are configured to form a third antenna array and to form a fourth antenna array, according to whether the electronic device is in the unfolded state or in the folded state.

According to an aspect of an embodiment, an electronic device includes: a first housing including: a first surface and a second surface connected to the first surface and having an area that is smaller than an area of the first surface; a second housing including a third surface and a fourth surface connected to the third surface and having an area that is smaller than an area of the third surface; a hinge structure connecting the first housing and the second housing to be foldable relative to each other at a folding axis, between a folded state of the electronic device and an unfolded state of the electronic device; a first antenna array provided at the first surface; and a second antenna array provided at the third surface; a flexible board connecting the first antenna array and the second antenna array, wherein the first antenna array and the second antenna array are configured to form a third antenna array and to form a fourth antenna array according to whether the electronic device is in the unfolded state or the folded state.

According to an aspect of an embodiment, an electronic device includes: an antenna structure; and a communication circuit electrically connected to the antenna structure, wherein the antenna structure includes: a first housing including a first surface and a second surface connected to the first surface; a second housing including a third surface and a fourth surface connected to the third surface; a hinge structure connecting the first housing and the second housing to be foldable relative to each other at a folding axis, between a folded state of the electronic device and an unfolded state of the electronic device; a first antenna array provided at the second surface; and a second antenna array provided at the fourth surface; a flexible board connecting the first antenna array and the second antenna array, and wherein the first antenna array and the second antenna array are configured to form a third antenna array and to form a fourth antenna array according to whether the electronic device is in the unfolded state or in the folded state.

BRIEF DESCRIPTION OF THE DRAWINGS

The above and other aspects and features of the present disclosure will be more apparent by describing in detail embodiments thereof with reference to the accompanying drawings, in which.

DETAILED DESCRIPTION

Figure 1:
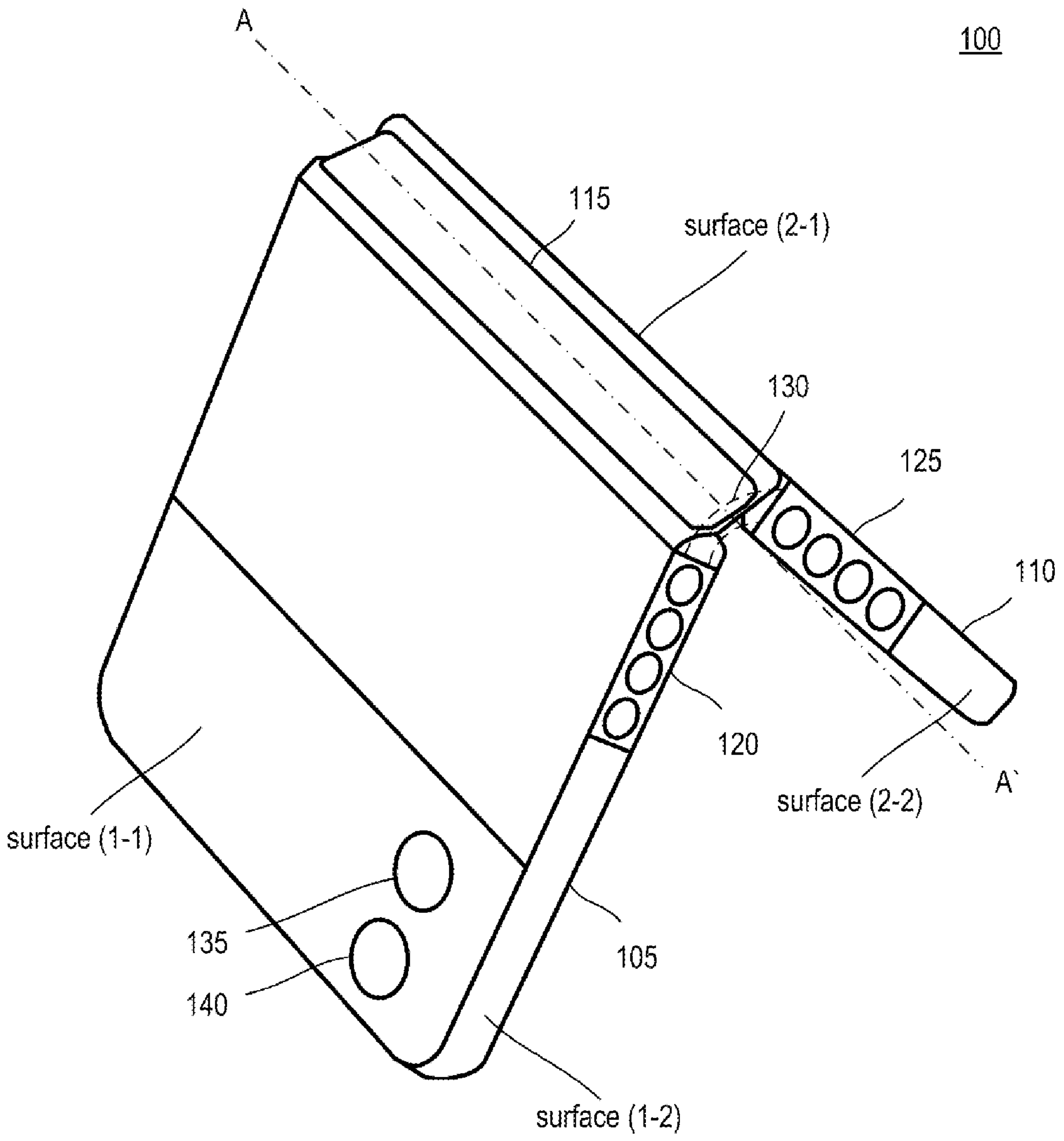
FIG. 1 is a perspective view of an electronic device according to one or more example embodiments.

Hereinafter, embodiments of the present disclosure will be described clearly and in detail with reference to the accompanying drawings. The same reference numerals are used for the same components in the drawings, and duplicate descriptions thereof are omitted.

FIG. 1 is a perspective view of an electronic device according to one or more example embodiments.

Referring to FIG. 1, in one or more example embodiments, an electronic device 100 may include, but is not limited to, a first housing 105, a second housing 110, a hinge structure 115, a first antenna array 120, a second antenna array 125, and a flexible board 130.

The first housing 105 and the second housing 110 may provide a space, in which electronic parts (for example, a printed circuit board, a battery, a processor, and the like) of the electronic device 100 may be disposed.

For example, the first housing 105 and the second housing 110, as illustrated according to one or more example embodiments in FIG. 1, may be disposed on opposite sides of a folding axis A-A' and may have a symmetrical shape. However, the first housing 105 and the second housing 110 are not limited to forms and coupling illustrated in the drawings of the present disclosure, and may be implemented by various shapes that may accommodate the electronic parts of the electronic device 100, or a combination and/or coupling of the parts.

The first housing 105 and the second housing 110 may be coupled to each other to be foldable or rotatable about the hinge structure 115. For example, the second housing 110 may be connected to the first housing 105 through the hinge structure 115 that is rotated about the folding axis A-A'. The electronic device 100 may have various states including an unfolded state and a folded state about the hinge structure 115, and a folding angle that is an angle between the first housing 105 and the second housing 110 may be changed according to a state of the electronic device 100. For example, the folding angle may be 180 degrees when the electronic device 100 is in the unfolded state, and the folding angle may be a relatively small angle (for example, 0 degrees to a specific angle) in the folded state.

The first housing 105 may include, but is not limited to, a surface (1-1) and a surface (1-2). For example, the surface (1-1) may be one surface, on which camera modules 135 and 140 are disposed on the first housing 105. The surface (1-2) may comprise a side surface of the surface (1-1). The surface (1-2) may be one surface that is connected to the surface (1-1) in the first housing 105 to have a specific angle and has an area that is smaller than an area of the surface (1-1). For example, the surface (1-2) may be one surface, on which the first antenna array 120 is disposed.

The second housing 110 may include, but is not limited to, a surface (2-1) and a surface (2-2). For example, the surface (2-1) is a surface corresponding to the surface (1-1), and one side of the surface (2-1) and one side of the surface (1-1) may contact each other or correspond to each other when the electronic device 100 is in the unfolded state. The surface (2-2) may comprise a side surface of the surface (2-1). The surface (2-2) may be one surface that is connected to the surface (2-1) to have a specific angle and has an area that is smaller than an area of the surface (2-1). For example, the surface (2-2) may be one surface, on which the second antenna array 125 is disposed.

The first antenna array 120 and the second antenna array 125 may be configured to transmit and receive wireless signals of various frequency bands.

In one or more example embodiments, the first antenna array 120 may be disposed in the first housing 105. For example, the first antenna array 120 may be disposed in one area of the surface (1-2). One surface of the surface (1-2), in which the first antenna array 120 is disposed, may be an area of the surface (1-2), which is adjacent to the hinge structure 115.

In one or more example embodiments, the second antenna array 125 may be disposed in the second housing 110. For example, the second antenna array 125 may be disposed in one area of the surface (2-2). The one area of the surface (2-2), in which the second antenna array 125 is disposed, may be an area of the surface (2-2), which is adjacent to the hinge structure 115.

The first antenna array 120 and the second antenna array 125 may be connected to each other through the flexible board (FPCB) 130. At least one area of the flexible board 130 may be bent when the electronic device 100 is in the unfolded state or the folded state through the hinge structure 115.

According to one or more example embodiments, the first antenna array 120 and the second antenna array 125 may be reconfigured based on a state (for example, the unfolded state or the folded state) of the electronic device 100. For example, the first antenna array 120 and the second antenna array 125 may be reconfigured as a third antenna array or a fourth antenna array according to the unfolded state or the folded state of the electronic device 100, which is determined through the hinge structure 115.

Figure 2A:
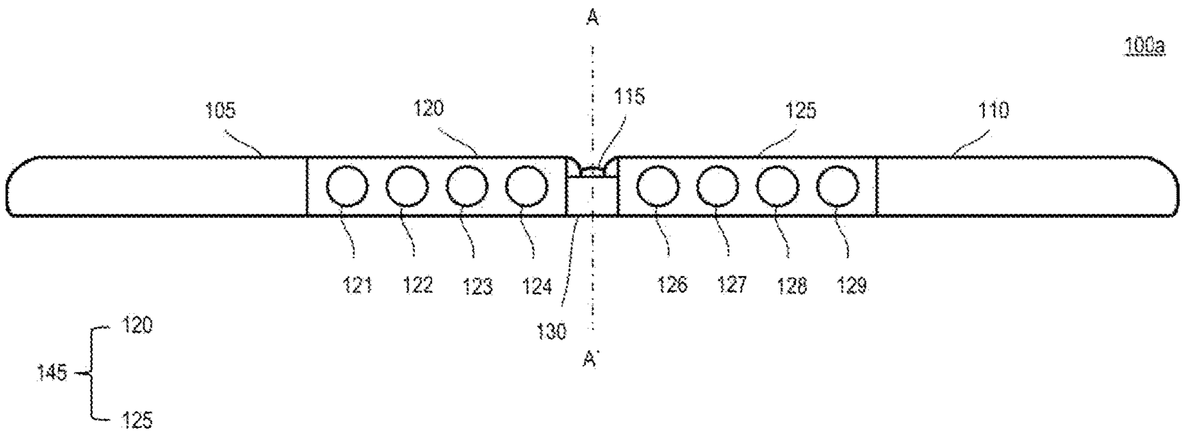
FIGS. 2A and 2B are side views according to one state of the electronic device of FIG. 1 according to one or more example embodiments.
Figure 2B:
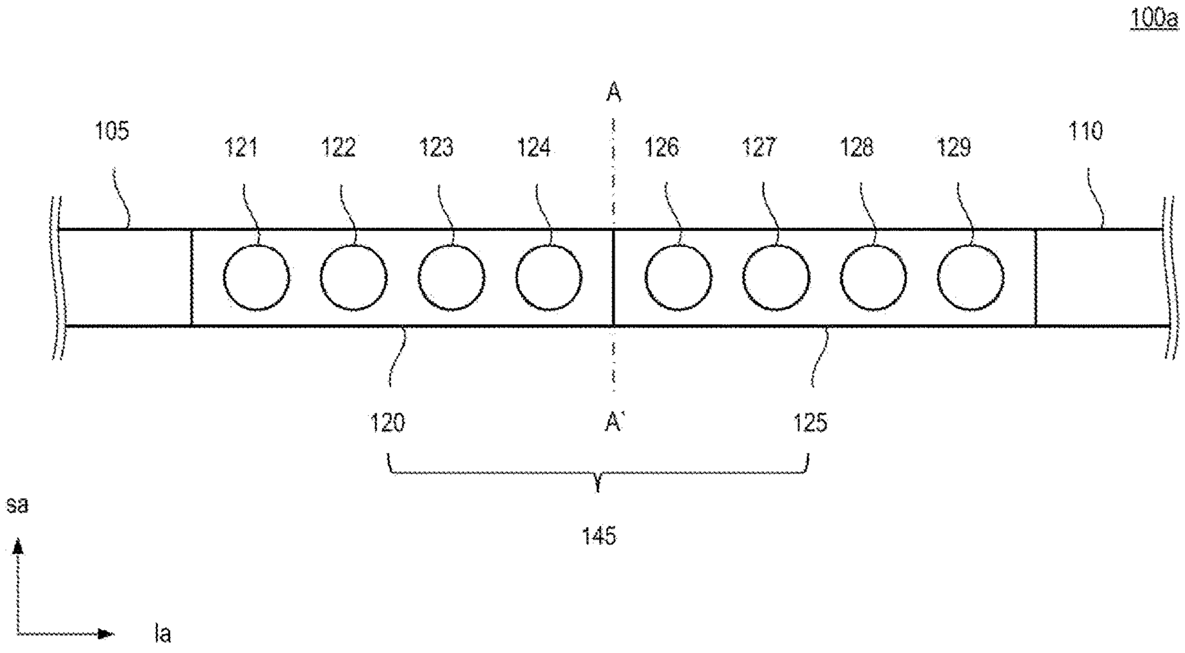

FIGS. 2A and 2B are side views according to one state of the electronic device of FIG. 1, according to one or more example embodiments.

Referring to FIG. 2A, according to one or more example embodiments, an electronic device 100*a* may be in the unfolded state through the hinge structure 115. For example, a folding angle in the unfolded state may be 180 degrees. The first antenna array 120 may be disposed on the surface (1-2) of the first housing 105, and the second antenna array 125 may be disposed on the surface (2-2) of the second housing 110.

The first antenna array 120 may include, but is not limited to, a plurality of first antenna elements 121, 122, 123 and 124, and the second antenna array 125 may include, but is not limited to, a plurality of second antenna elements 126, 127, 128 and 129. For example, the plurality of first antenna elements 121, 122, 123 and 124 and the plurality of second antenna elements 126, 127, 128 and 129 may be patch antennas. The plurality of first antenna elements 121, 122, 123 and 124 may be configured to radiate beams from the surface (1-2) of the first housing 105 toward another electronic device, and the plurality of second antenna elements 126, 127, 128 and 129 may be configured to radiate beams from the surface (2-2) of the second housing 110 toward another electronic device.

For example, according to one or more example embodiments, the first antenna array 120 and the second antenna array 125 may have a 1×n arrangement (here, n is a natural number). Alternatively, according to one or more example embodiments, the first antenna array 120 and the second antenna array 125 may have a m×n arrangement (here, m is a natural number).

When the electronic device 100*a* is in the unfolded state, the first antenna array 120 and the second antenna array 125 may be reconfigured as a third antenna array 145. The third antenna array 145 may include, but is not limited to, the first antenna array 120 and the second antenna array 125 when the electronic device 100*a* is in the unfolded state. The third antenna array 145 may be configured such that the first antenna array 120 and the second antenna array 125 are arranged along an axis that is perpendicular to the folding axis A-A' in the unfolded state. That is, the third antenna array 145 may be a new antenna array, formed by the first antenna array 120 and the second antenna array 125 along the axis that is perpendicular to the folding axis A-A' when the electronic device 100*a* is in the unfolded state.

As one or more example embodiments, the flexible board 130 may connect one side surface of the first antenna array 120 and one side surface of the second antenna array 125. According to one or more example embodiments, the one side surface of the first antenna array 120 and the one side surface of the second antenna array 125 may correspond to each other when the electronic device 100*a* is in the unfolded state. The flexible board 130 may still connect the first antenna array 120 and the second antenna array 125 even though the electronic device 100*a* is in the unfolded state because it has flexibility characteristics.

Referring to FIG. 2B, according to one or more example embodiments, one side surface of the first antenna array 120 and one side surface of the second antenna array 125 may be arranged to be adjacent to each other when the electronic device 100*a* is in the unfolded state. In detail, when the electronic device 100*a* is in the unfolded state, among side surfaces that constitute the first antenna array 120 and the second antenna array 125, relatively short ones may be disposed to correspond to each other. Then, when the electronic board is in the unfolded state, the flexible board 130 may be located on a rear side of opposite surfaces to the surfaces of the first antenna array 120 and the second antenna array 125, on which the plurality of first antenna elements 121, 122, 123 and 124 and the plurality of second antenna elements 126, 127, 128 and 129 are provided.

When a lengthwise direction of the relatively long opposite surfaces of the side surfaces that comprise the first antenna array 120 and the second antenna array 125 is defined as a first direction la (or a long axis direction) and a lengthwise direction of the relatively short surfaces thereof is defined as a second direction sa (or a short axis direction), the first antenna array 120 and the second antenna array 125 may be arranged along the first direction la. Accordingly, the third antenna array 145 may have more antenna elements along the first direction la.

For example, when the first antenna array 120 and the second antenna array 125 have a 1×n arrangement, the third antenna array 145, in which the first antenna array 120 and the second antenna array 125 are reconfigured, may have a 1×2n arrangement. Accordingly, according to the above-described embodiment, when the electronic device 1001 is in the unfolded state, the reconfigured third antenna array 145 may include, but is not limited to, more antenna elements in the first direction la as compared with the first antenna array 120 or the second antenna array 125. According to the increased number of the antenna elements, the third antenna array 145 may have a further enhanced transmission power and a further enhanced signal reception sensitivity as compared with the first antenna array 120 or the second antenna array 125. Furthermore, because the third antenna array 145 may form more beams in the first direction la, it may have an enhanced beam scan capacity.

Furthermore, when a surface (1-1) of the electronic device 100*a*, on which the camera modules 135 and 140 are disposed, a surface (2-1) corresponding to the surface (1-1), a surface (1-2) having a specific angle, and a surface (2-2) are defined as side surfaces of the electronic device 100*a*, the third antenna array 145 of FIGS. 2A and 2B may form a beam having an enhanced transmission/reception capacity and an enhanced beam scan capacity in the side surface direction of the electronic device 100*a* and the first direction la.

Figure 3A:
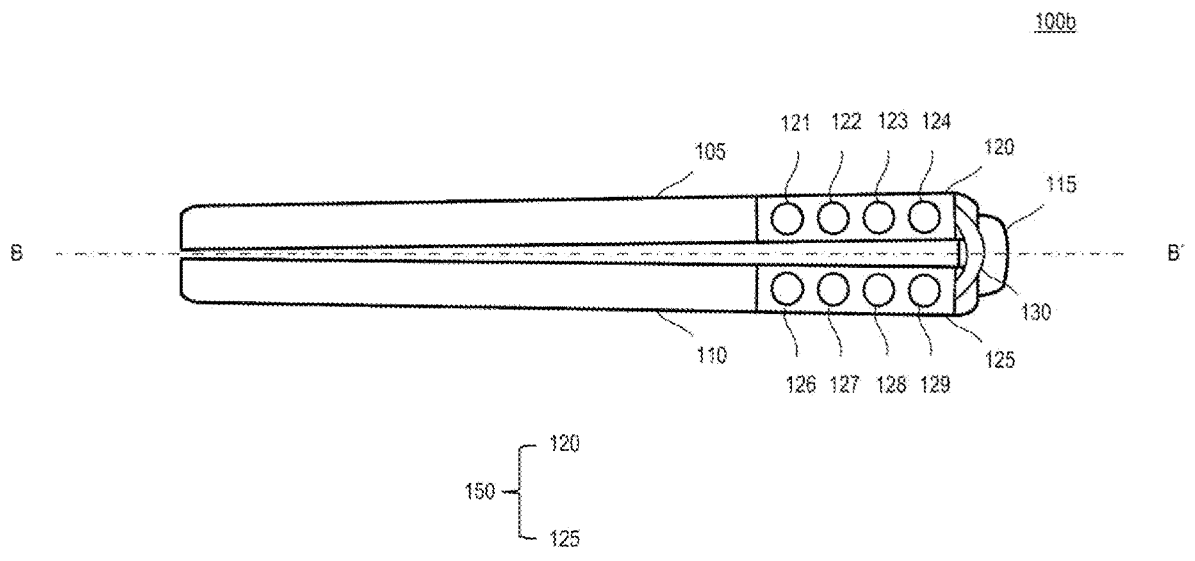
FIGS. 3A and 3B are side views according to another state of the electronic device of FIG. 1 according to one or more example embodiments.
Figure 3B:
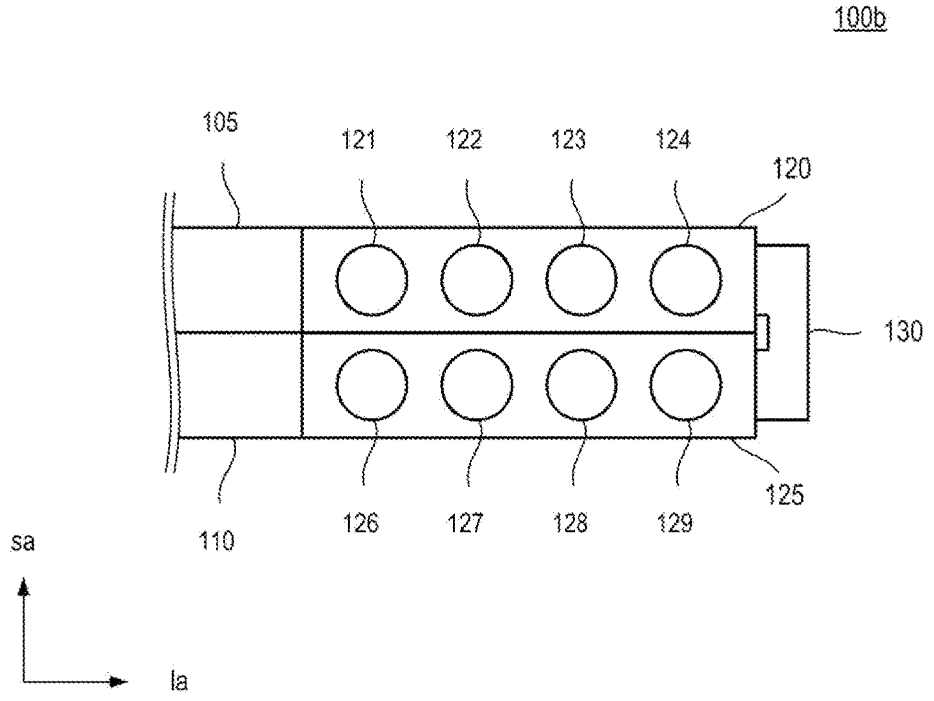

FIGS. 3A and 3B are side views according to another state of the electronic device of FIG. 1, according to one or more example embodiments. Hereinafter, a duplicate description of repeated parts will be omitted.

Referring to FIG. 3A, according to one or more example embodiments, an electronic device 100*b* may have a folded state through the hinge structure 115. For example, in the folded state, the folding angle may be from 0 degrees (for example, FIG. 3B) to a specific angle (for example, FIG. 3A). The first antenna array 120 may be disposed on the surface (1-2) of the first housing 105, and the second antenna array 125 may be disposed on the surface (2-2) of the second housing 110. The first antenna array 120 may include, but is not limited to, the plurality of first antenna elements 121, 122, 123 and 124, and the second antenna array 125 may include, but is not limited to, the plurality of second antenna elements 126, 127, 128 and 129.

When the electronic device 100*b* is in the folded state, the first antenna array 120 and the second antenna array 125 may be reconfigured to form a fourth antenna array 150. When the electronic device 100*b* is in the folded state, the first antenna array 120 and the second antenna array 125 may be reconfigured as the fourth antenna array 150. The fourth antenna array 150 may be configured such that the first antenna array 120 and the second antenna array 125 are arranged to correspond to each other with respect to an axis B-B' that is perpendicular to the folding axis A-A' in the folded state. That is, the fourth antenna array 150 may be a new antenna array, in which the first antenna array 120 and the second antenna array 125 that are disposed to correspond to each other with respect to the axis B-B' that is perpendicular to the folding axis A-A' when the electronic device 100*b* is in the folded state are formed.

According to one or more example embodiments, the flexible board 130 may connect one side surface of the first antenna array 120 and one side surface of the second antenna array 125. Then, an opposite side surface of the first antenna array 120 and an opposite side surface of the second antenna array 125 may correspond to each other when the electronic device 100*b* is in the folded state. The flexible board 130 may still connect the first antenna array 120 and the second antenna array 125 even though the electronic device 100*b* is in the folded state as it has flexibility characteristics.

Referring to FIG. 3B, according to one or more example embodiments, when the electronic device 100*b* is in the folded state, the opposite side surface of the first antenna array 120 and the opposite side surface of the second antenna array 125 may be arranged to be adjacent to each other. In detail, when the electronic device 100*b* is in the folded state, among the side surfaces that constitute the first antenna array 120 and the second antenna array 125, relatively long opposite side surfaces may be disposed to correspond to each other. Then, the flexible board 130 may be bent as the hinge structure 115 is rotated when the electronic board is in the folded state.

The first antenna array 120 and the second antenna array 125 may be arranged along the second direction sa. Accordingly, the fourth antenna array 150 may have more antenna elements along the second direction sa.

For example, when the first antenna array 120 and the second antenna array 125 have a 1×n arrangement, the fourth antenna array 150, in which the first antenna array 120 and the second antenna array 125 are reconfigured, may have a 2×n arrangement, that is, a 2-dimensional arrangement. Accordingly, according to the above-described embodiment, when the electronic device 100*b* is in the folded state, the reconfigured fourth antenna array 150 may include, but is not limited to, more antenna elements in the second direction sa as compared with the first antenna array 120 or the second antenna array 125. According to the increased number of the antenna elements, the fourth antenna array 150 may have a further enhanced transmission power and a further enhanced signal reception sensitivity as compared with the first antenna array 120 or the second antenna array 125. Furthermore, since the fourth antenna array 150 may perform beam scanning in both the first direction la and the second direction sa, the fourth antenna array 150 may have an improved communication radius while maintaining a high gain.

Furthermore, the fourth antenna array 150 of FIGS. 3A and 3B may form an enhanced transmission/reception capacity and an enhanced beam scan capacity in the side surface direction of the electronic device 100*b*, and the first direction la and the second direction sa.

Figure 4:
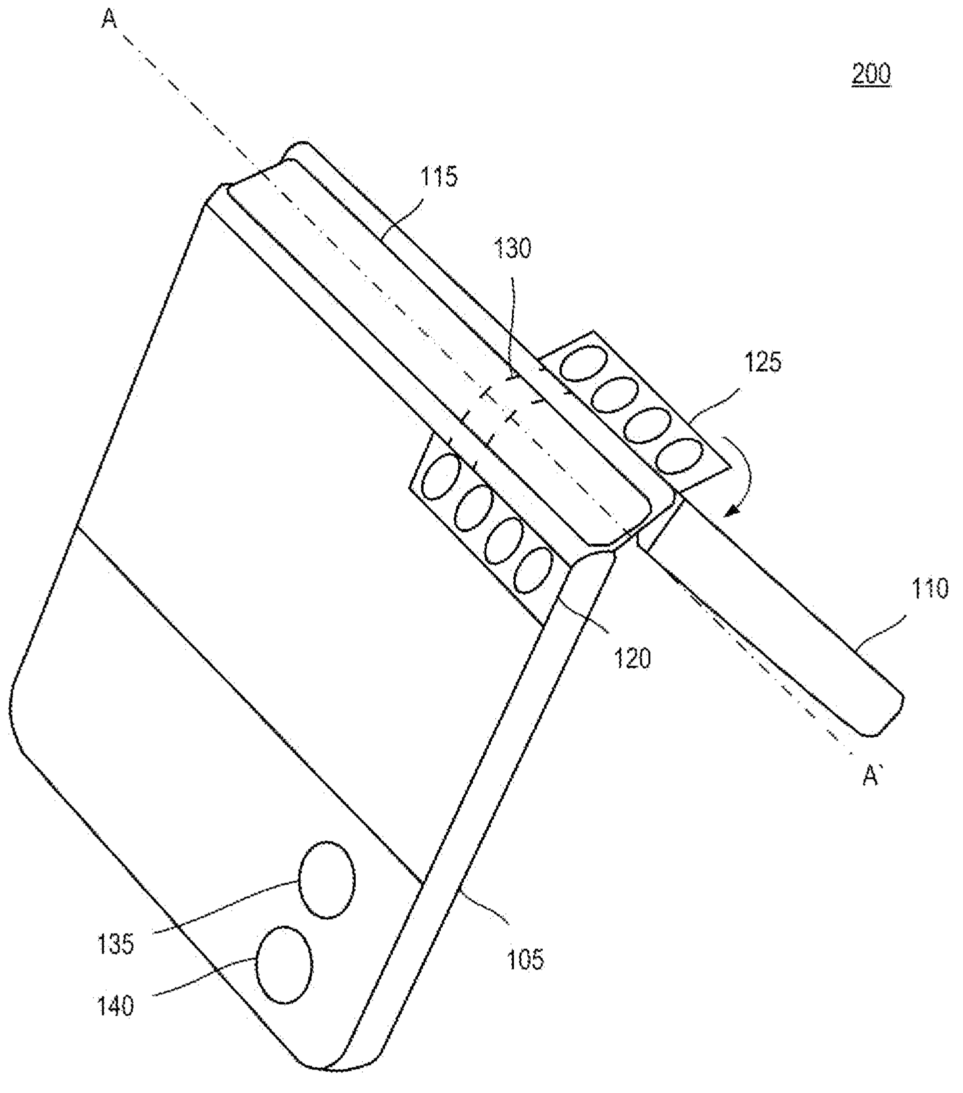
FIG. 4 is a perspective view of an electronic device according to one or more example embodiments.

FIG. 4 is a perspective view of an electronic device according to one or more example embodiments.

Referring to FIG. 4, according to one or more example embodiments, an electronic device 200 may include, but is not limited to, the first housing 105, the second housing 110, the hinge structure 115, the first antenna array 120, the second antenna array 125, and the flexible board 130.

Unlike FIG. 1, the first antenna array 120 included in the electronic device 200 according to one or more example embodiments of FIG. 4 may have an area that is larger than that of the surface (1-2) and may be disposed in one area of the surface (1-1), on which the camera modules 135 and 140 are disposed. An area of the surface (1-1), in which the first antenna array 120 is disposed, may be an area of the surface (1-1), which is relatively adjacent to the hinge structure 115. Furthermore, the second antenna array 125 may be disposed in an area of the surface (2-1), which has an area that is larger than that of the surface (2-2). An area of the surface (2-1), in which the second antenna array 125 is disposed, may be an area of the surface (2-1), which is relatively adjacent to the hinge structure 115.

The first antenna array 120 and the second antenna array 125 may be connected to each other through the flexible board 130.

According to one or more example embodiments, the first antenna array 120 and the second antenna array 125 may be reconfigured based on a state (for example, the unfolded state or the folded state) of the electronic device 200. For example, the first antenna array 120 and the second antenna array 125 may be reconfigured as the third antenna array or the fourth antenna according to the unfolded state of the folded state of the electronic device 200, which is determined through the hinge structure 115.

The one side surface of the surface (1-1) of the first housing 105 and the one side surface of the surface (2-1) of the second housing 110, in which the first antenna array 120 and the second antenna array 125 are disposed, may be disposed to correspond to each other when the electronic device 200 is in the unfolded state and may be disposed to face each other when the electronic device 200 is in the folded state. Accordingly, the respective side surfaces of the first antenna array 120 and the second antenna array 125 may be disposed to correspond to each other when the electronic device 200 is in the unfolded state to form the third antenna array 145. Furthermore, the first antenna array 120 and the second antenna array 125 may be disposed to face each other when the electronic device 200 is in the folded state to form the fourth antenna array 150.

Figure 5A:
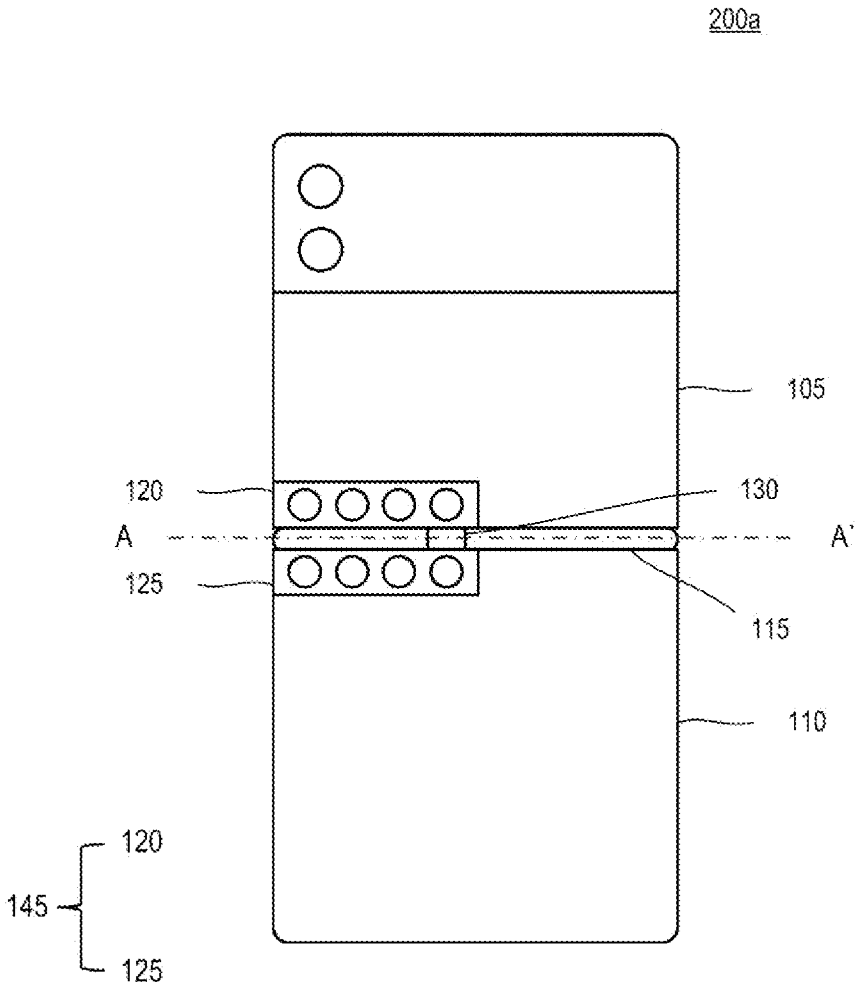
FIGS. 5A and 5B are side views according to one state of the electronic device of FIG. 4 according to one or more example embodiments.
Figure 5B:
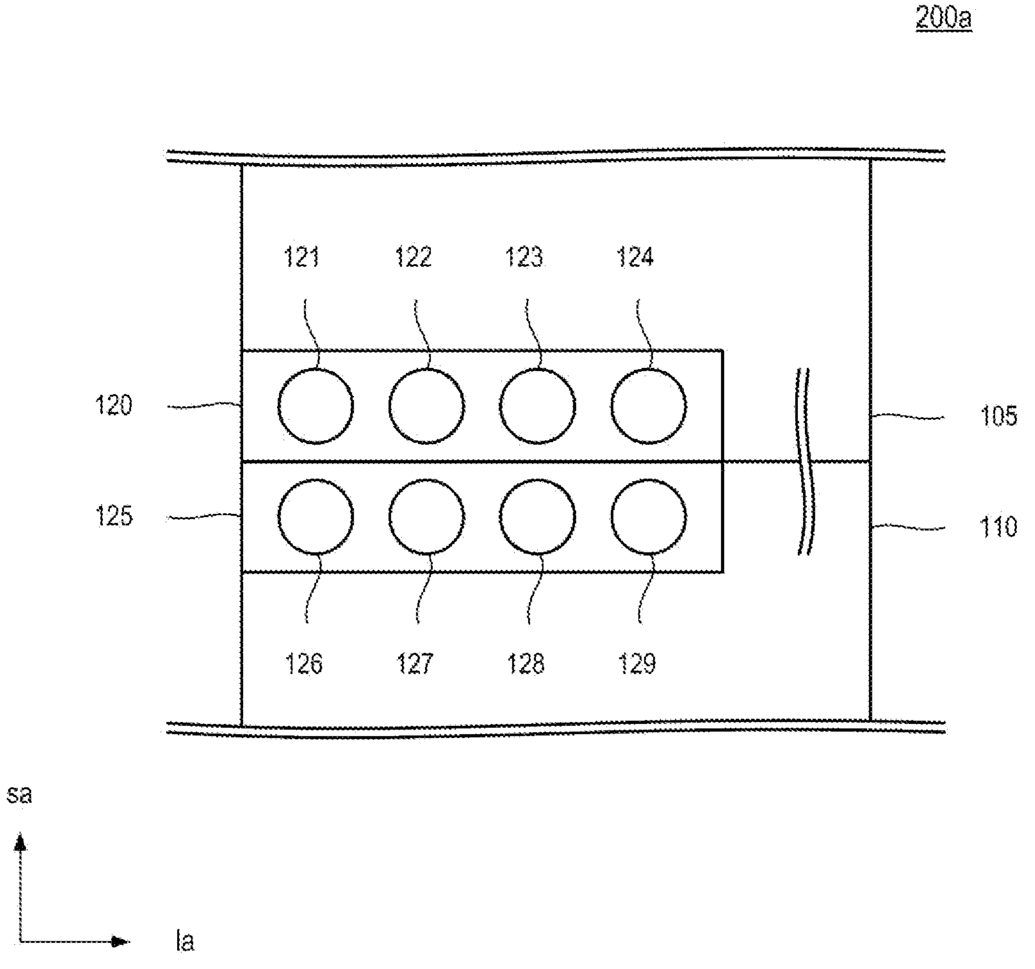

FIGS. 5A and 5B are side views according to one state of the electronic device of FIG. 4, according to one or more example embodiments.

Referring to FIG. 5A, according to one or more example embodiments, an electronic device 200*a* may be in the unfolded state through the hinge structure 115. The first antenna array 120 may be disposed on the surface (1-1) of the first housing 105, and the second antenna array 125 may be disposed on the surface (2-1) of the second housing 110. Because the respective side surfaces of the surface (1-1) and the surface (2-1) are disposed to correspond to each other, the respective side surfaces of the first antenna array 120 and the second antenna array 125 also may be disposed to correspond to each other. For example, the first antenna array 120 and the second antenna array 125 may be disposed to be symmetrical to each other with respect to the folding axis A-A'.

When the electronic device 200*a* is in the unfolded state, the first antenna array 120 and the second antenna array 125 may be reconfigured as the third antenna array 145. The third antenna array 145 may include, but is not limited to, the first antenna array 120 and the second antenna array 125 corresponding to the unfolded state of the electronic device 200*a*. The third antenna array 145 may be configured such that the first antenna array 120 and the second antenna array 125 are arranged along the axis that is perpendicular to the folding axis A-A' in the unfolded state. That is, the third antenna array 145 may comprise a new antenna array, which the first antenna array 120 and the second antenna array 125 form along the axis that is perpendicular to the folding axis A-A' when the electronic device 200*a* is in the unfolded state.

As one or more example embodiments, the flexible board 130 may connect one side surface of the first antenna array 120 and one side surface of the second antenna array 125. Here, the one side surface of the first antenna array 120 and the one side surface of the second antenna array 125 may correspond to each other when the electronic device 200*a* is in the unfolded state. Because the flexible board 130 has flexibility characteristics, it may still connect the first antenna array 120 and the second antenna array 125 even though the electronic device 200*a* is in the unfolded state.

Referring to FIG. 5B, as one or more example embodiments, the one side surface of the first antenna array 120 and the one side surface of the second antenna array 125 may be arranged to be adjacent to each other when the electronic device 200*a* is in the unfolded state. In detail, among the side surfaces that constitute the first antenna array 120 and the second antenna array 125, the relatively long side surfaces may be disposed to correspond to each other when the electronic device 200*a* is in the unfolded state. Then the flexible board 130 may be located on an opposite surface to the surface, on which the plurality of first antenna elements 121, 122, 123 and 124 and the plurality of second antenna elements 126, 127, 128 and 129 are formed, in the first antenna array 120 and the second antenna array 125, when the electronic board is in the unfolded state.

When, among the side surfaces that comprise the first antenna array 120 and the second antenna array 125, a lengthwise direction of the relatively long side surfaces is defined as the first direction la (or a long axis direction) and a lengthwise direction of the relatively short opposite side surfaces is defined as the second direction sa (or a short axis direction), the first antenna array 120 and the second antenna array 125 may be arranged long the second direction sa. Accordingly, the third antenna array 145 may have more antennas along the second direction sa.

For example, when the first antenna array 120 and the second antenna array 125 has a 1×n arrangement, the third antenna array 145, in which the first antenna array 120 and the second antenna array 125 are reconfigured, may have a 2×n arrangement. Accordingly, according to the above-described one or more example embodiments, when the electronic device 200*a* is in the unfolded state, the reconfigured third antenna array 145 may include, but is not limited to, more antenna elements in the second direction sa than the first antenna array 120 or the second antenna array 125. According to the increased number of the antenna elements, the third antenna array 145 may have a further enhanced transmission power and a further enhanced signal reception sensitivity as compared with the first antenna array 120 or the second antenna array 125. Furthermore, because the third antenna array 145 may form more beams in the first direction la, the third antenna array 145 may have an enhanced beam scan capacity.

When the surface (1-1), on which the camera modules 135 and 140 are disposed in the electronic device 200*a* in the unfolded state and the surface (2-1) corresponding to the surface (1-1) are defined as the rear surface of the electronic device 200*a*, the third antenna array 145 of FIGS. 5A and 5B may form a beam having an enhanced transmission/reception capacity and an enhanced beam scan capacity in the rear surface direction of the electronic device 200*a*, the first direction la, and the second direction sa.

Figure 6A:
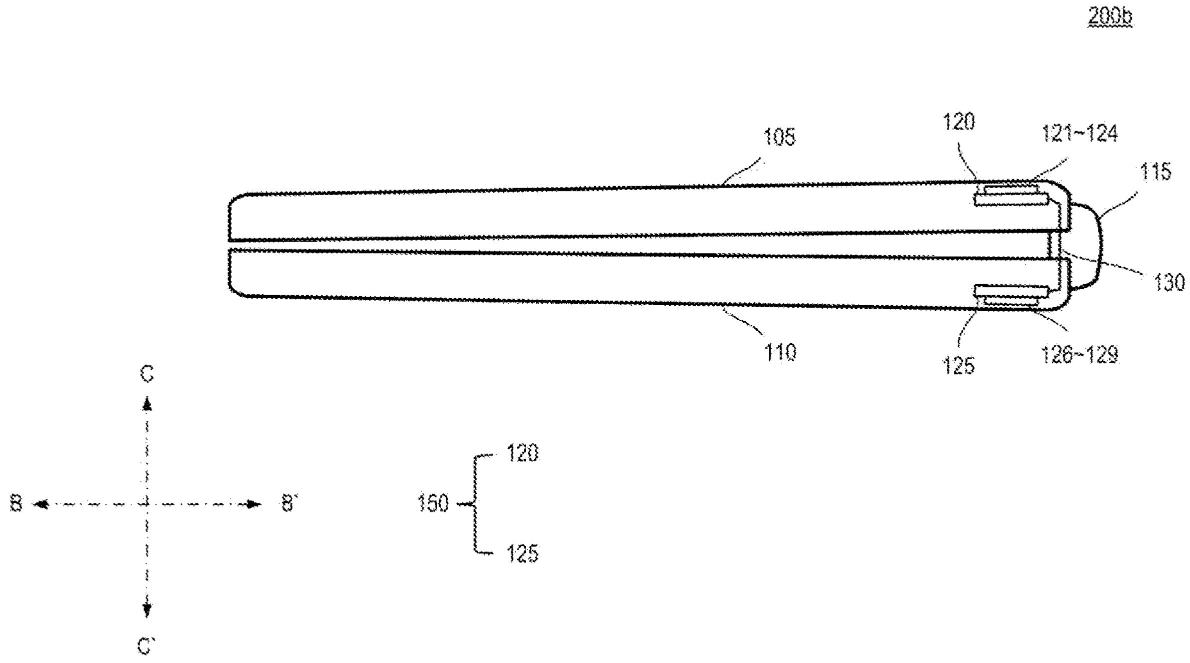
FIG. 6A is a side view according to another state of the electronic device of FIG. 4 according to one or more example embodiments.
Figure 6B:
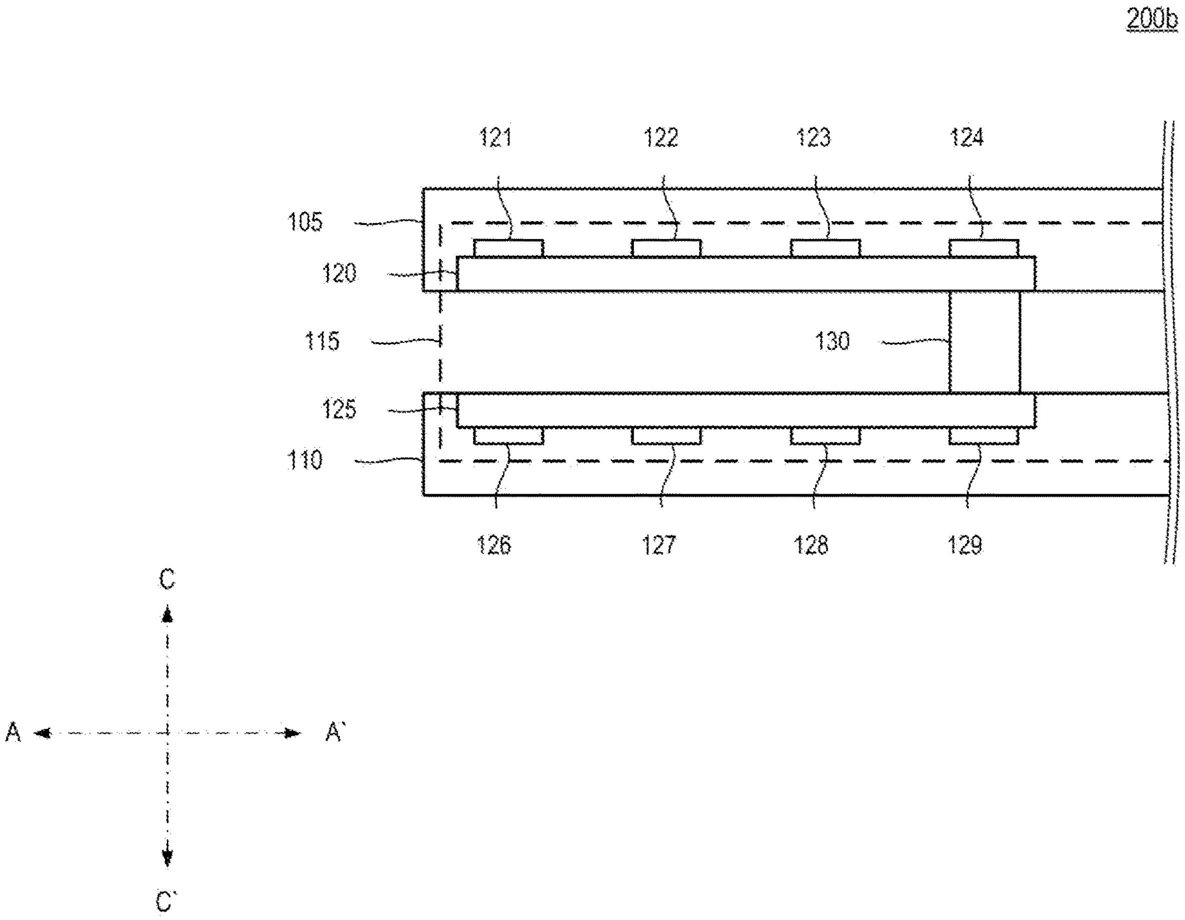
FIG. 6B is another side view according to another state of the electronic device of FIG. 4 according to one or more example embodiments.

FIG. 6A is a side view according to another state of the electronic device of FIG. 4, according to one or more example embodiments, and FIG. 6B is another side view according to another state of the electronic device of FIG. 4, according to one or more example embodiments. Hereinafter, a duplicate description of repeated parts will be omitted.

Referring to FIG. 6A, as one or more example embodiments, an electronic device 200*b* may be in the folded state through the hinge structure 115. The first antenna array 120 may be disposed on the surface (1-1) of the first housing 105, and the second antenna array 125 may be disposed on the surface (2-1) of the second housing 110. The first antenna array 120 may include, but is not limited to, the plurality of first antenna elements 121, 122, 123 and 124, and the second antenna array 125 may include, but is not limited to, the plurality of second antenna elements 126, 127, 128 and 129. The first antenna array 120 may be embedded in the first housing 105, and the second antenna array 125 may be embedded in the second housing 110.

When the electronic device 200*b* is in the folded state, the first antenna array 120 and the second antenna array 125 may be reconfigured as the fourth antenna array 150. The fourth antenna array 150 may include, but is not limited to, the first antenna array 120 and the second antenna array 125 corresponding to the folded state of the electronic device 200*b*. The fourth antenna array 150 may be configured such that the first antenna array 120 and the second antenna array 125 are arranged to be oriented to an axis C-C' that is perpendicular to the folding axis A-A' in the folded state. That is, the fourth antenna array 150 may comprise a new antenna array, in which the first antenna array 120 and the second antenna array 125 that are disposed to be oriented to the axis C-C' that is perpendicular to the folding axis A-A' are formed when the electronic device 200*b* is in the folded state.

Accordingly, in the folded state, the first antenna array 120 and the second antenna array 125 that form the fourth antenna array 150 may form beams in opposite directions.

Referring to FIG. 6B, when the electronic device 200*b* is in the folded state, the plurality of first antenna elements 121, 122, 123 and 124 included on one side surface of the first antenna array 120 and the plurality of second antenna elements 126, 127, 128 and 129 included in one side surface of the second antenna array 125 may be arranged along the folding axis A-A'.

As one or more example embodiments, the flexible board 130 may connect an opposite side surface to the one side surface of the first antenna array 120 and an opposite side surface to the one side surface of the second antenna array 125. The opposite side surface of the first antenna array 120 and the opposite side surface of the second antenna array 125 may correspond to each other when the electronic device 200*b* is in the folded state. According to one or more example embodiments, the one side surfaces and the opposite side surfaces may correspond to, among the side surfaces that comprise the first antenna array 120 and the second antenna array 125, the relatively long side surfaces. Because the flexible board 130 has flexibility characteristics, it may still connect the first antenna array 120 and the second antenna array 125 even though the electronic device 200*b* is in the folded state.

Through the flexible board 130, the first antenna array 120 and the second antenna array 125 connected to each other also may be reconfigured as the fourth antenna array 150 in the folded state. Then, because the first antenna array 120 and the second antenna array 125 are disposed to be oriented to the axis C-C' that is perpendicular to the folding axis A-A', the plurality of first antenna elements 121, 122, 123 and 124 included in the fourth antenna array 150 and the plurality of second antenna elements 126, 127, 128 and 129 included in the second antenna array 125, may form beams in facing directions in the folded state.

For example, when the first antenna array 120 and the second antenna array 125 has a 1×n arrangement, the fourth antenna array 150, in which the first antenna array 120 and the second antenna array 125 are reconfigured, may be operated independently, and may have two 1×n arrangements, in which beams may be formed in the oriented directions. Accordingly, according to the above-described one or more example embodiments, because the reconfigured fourth antenna array 150 may form beams to various areas of the electronic device 200*b* when the electronic device 200*b* is in the folded state, a communication area may be expanded, and thus, a cumulative distribution function (CDF) performance of the electronic device 200*b* may be enhanced.

Figure 7:
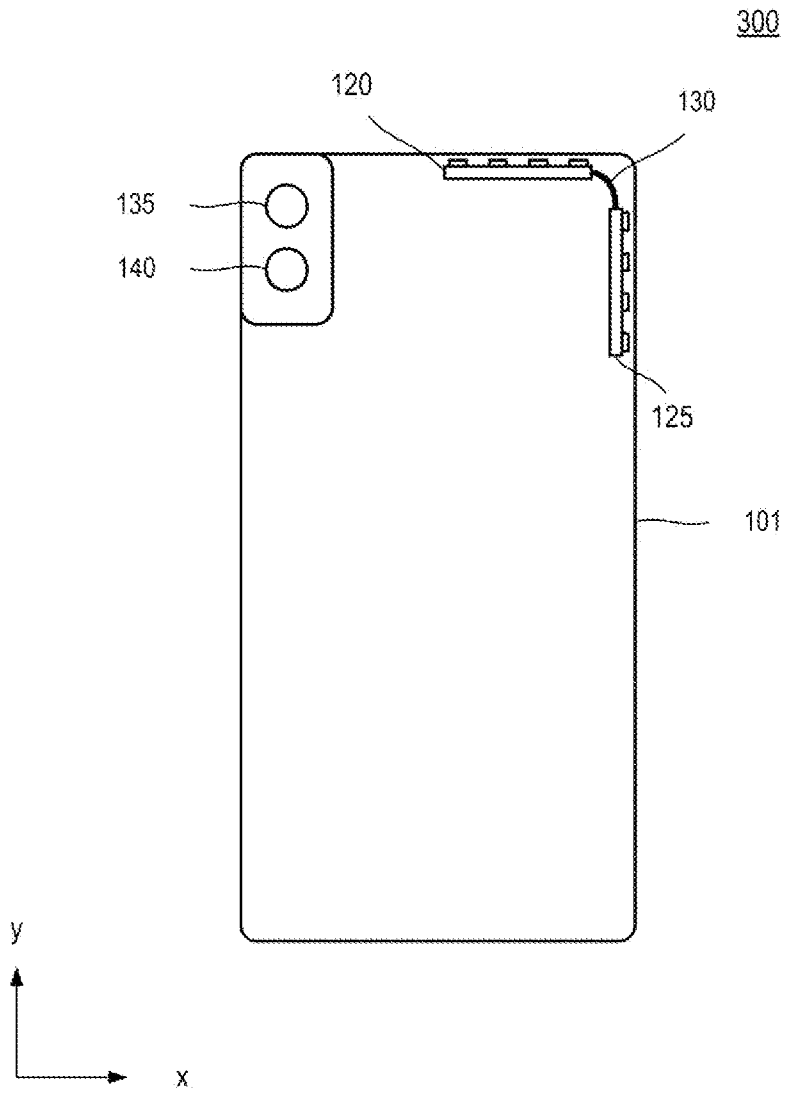
FIG. 7 illustrates an electronic device according to one or more example embodiments.

FIG. 7 illustrates an electronic device according to one or more example embodiments.

Referring to FIG. 7, as one or more example embodiments, an electronic device 300 may include, but is not limited to, a housing 101, the first antenna array 120, the second antenna array 125, and the flexible board 130.

As one or more example embodiments, the first antenna array 120 and the second antenna array 125 may be disposed on, among the side surfaces included in the housing 101, two side surfaces connected to each other to have a specific angle, respectively. According to one or more example embodiments, one of the two side surfaces may be perpendicular to a first axis "x" and the other may be perpendicular to a second axis "y".

According to one or more example embodiments, the first antenna array 120 and the second antenna array 125 may be disposed in an edge area of the housing 101.

The first antenna array 120 and the second antenna array 125 may be connected to each other through the flexible board 130, a length of which may be adjusted, based on flexibility characteristics. According to one or more example embodiments, the flexible board 130 may connect one side surface of the first antenna array 120 and one side surface of the second antenna array 125.

The first antenna array 120 disposed on one side surface may be configured to form a beam toward the second axis “y” along the first axis “x”. The second antenna array 125 disposed on the other side surface may be configured to form a beam toward the first axis “x” along the second axis “y”. That is, the first antenna array 120 and the second antenna array 125 may have different communication areas.

Furthermore, the first antenna array 120 and the second antenna array 125 may be applied to the electronic device 300 having a foldable shape according to the above-described one or more example embodiments, as well as the electronic device 300 illustrated in FIG. 7.

Figure 8:
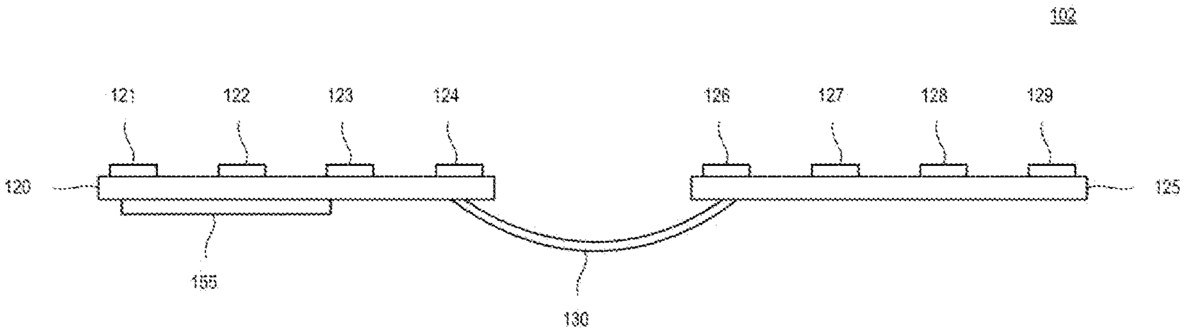
FIG. 8 illustrates an antenna module according to one or more example embodiments.

FIG. 8 illustrates an antenna module according to one or more example embodiments.

Referring to FIG. 8, an antenna module 102 according to one or more example embodiments may include, but is not limited to, an antenna structure and a communication circuit 155. The antenna structure may include, but is not limited to, the first antenna array 120, the second antenna array 125, and the flexible board 130 that connects the first antenna array 120 and the second antenna array 125.

The first antenna array 120 and the second antenna array 125 may be implemented according to the above-described one or more example embodiments (for example, FIGS. 1, 2A, 2B, 3A, 3B, 4, 5A, 5B, 6A, 6B and 7).

The communication circuit 155 may be electrically connected to the antenna structure. For example, the communication circuit 155 may be connected to the first antenna array 120 as illustrated, or the communication circuit 155 may be connected to the second antenna array 125 or the communication circuit 155 may be connected to the first antenna array 120 and the second antenna array 125, unlike one or more example embodiments shown in FIG. 8. For example, the communication circuit 155 may be disposed on one surface of any one of the first antenna array 120 and the second antenna array 125.

The communication circuit 155 may generate and process wireless signals and deliver them to the first antenna array 120 and/or the second antenna array 125 according to one or more example embodiments. For example, the communication circuit 155 may convert a base band signal to a radio frequency (RF) signal having a millimeter band and deliver it to the first antenna array 120 and/or the second antenna array 125.

Alternatively, the communication circuit 155 may control beamforming of the first antenna array 120 and/or the second antenna array 125.

According to the above-described one or more example embodiments, the first antenna array 120 and the second antenna array 125 of the electronic device may be reconfigured. The communication circuit 155 may independently drive one of the first antenna array 120 and the second antenna array 125, or may simultaneously drive the first antenna array 120 and the second antenna array 125 according to the shape of the first antenna array 120 and the second antenna array 125 that are reconfigured. For example, the communication circuit 155 may maximize a transmission/reception gain or expand a communication area by simultaneously driving the first antenna array 120 and the second antenna array 125.

According to one or more example embodiments, the communication circuit 155 may steer the beam formed from the third antenna array 145 along the axis that is perpendicular to the folding axis A-A' in the unfolded state of the electronic device 100*a*.

According to one or more example embodiments, the communication circuit 155 may steer the beam formed from the fourth antenna array 150 along the axis that is perpendicular to the folding axis A-A' in the folded state of the electronic device 100*b*.

According to one or more example embodiments, the communication circuit 155 may steer the beam formed from the third antenna array 145 along the folding axis A-A' or the axis that is perpendicular to the folding axis A-A'.

According to one or more example embodiments, the communication circuit 155 may steer the beam formed from the first antenna array 120 and the beam formed from the second antenna array 125 along the folding axis A-A' in the folded state of the electronic device 200*b*.

Figure 9:
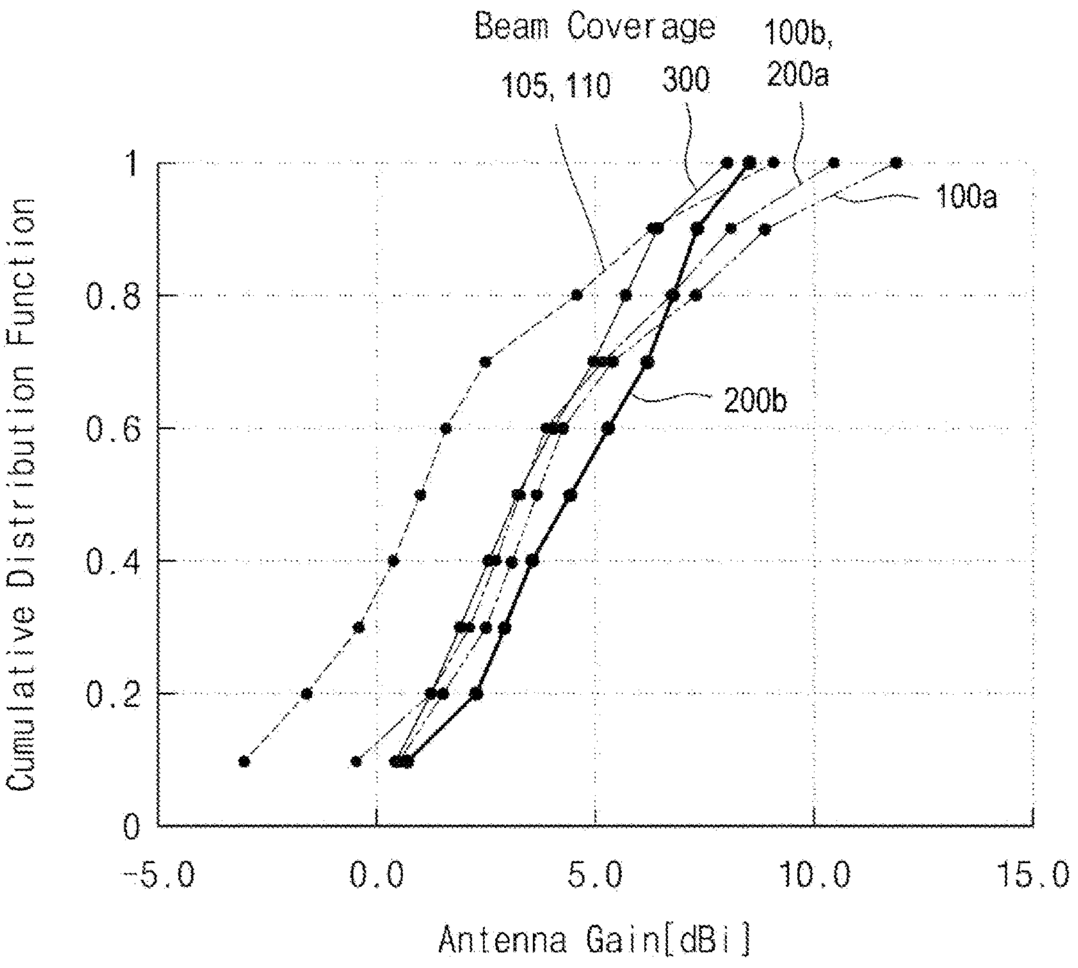
FIG. 9 illustrates a CDF according to a gain of an antenna according to one or more example embodiments.

FIG. 9 illustrates a CDF according to a gain of an antenna according to one or more example embodiments.

A millimeter wave band includes frequency range 2 (FR2) that is defined in a 5th generation (5F) technology. In the FR2 band, it may be necessary to adjust desired effective isotopically radiated power, that is, desired EIRP, by utilizing the antenna array structure to overcome signal-to-noise ratio (SNR) loss generated due to a high transmission loss in a propagation medium (for example, air).

An example of an evaluation index of a transmission operation through an antenna module in the FR2 band may include, but is not limited to, a peak EIRP that is a peak value of the EIRP and a 50%-tile CDF. For example, the peak EIRP may be determined based on a gain of the antenna, an output of the communication circuit, such as a radio frequency integrated circuit (RFIC), and an arrangement of the antenna arrays and. The 50%-tile CDF may mean that 50% of a formed antenna transmission sphere satisfies the EIRP, and for example, may be determined based on the EIRP, the number of antenna modules, the locations of the antenna modules, beam steering of the antenna modules, and the like.

As an example, the 50%-tile CDF defined by a 3rd generation partnership project (3GPP) is as in Table 1.

TABLE 1

| F | Min EIRP at 50%-tile CDF (dBm) |
|---|---|
| n257 | 11.5 |
| n258258 | 11.5 |
| n259 | 5.8 |
| n260 | 8 |
| n261 | 11.5 |

Here, “F” is a communication band of FR2 defined by 3GPP, and Min EIRP means a minimum reference EIRP required by the 50%-tile CDF. To satisfy the above-described evaluation indexes of the transmission operation, a size of the antenna array may be increased, but it may be required to satisfy the evaluation indexes with a minimum number of antenna modules or a minimum number of antenna arrays as a mounting environment of the antenna array is gradually reduced.

Referring to FIG. 9, it may be identified that the evaluation indexes of the transmission operation are satisfied even when a minimum number (for example, two) of antenna arrays according to one or more example embodiments are provided.

For example, a higher antenna gain may be secured when the first antenna array 120 and the second antenna array 125 are driven as the third antenna array 145 or the fourth antenna array 150 (100*a*, 100*b*, 200*a*, and 200*b*) or the first antenna array 120 and the second antenna array 125 are driven to be oriented in different directions than when the first antenna array 120 or the second antenna array 125 is independently driven (105 and 110).

In particular, in the case of the 50%-CDF, all of the antenna array structures 100*a*, 100*b*, 200*a*, 200*b*, and 300 may realize an increase of the gain.

FIGS. 10A, 10B, 10C, 10D and 10E illustrate beam areas according to one or more example embodiments.

Figure 10A:
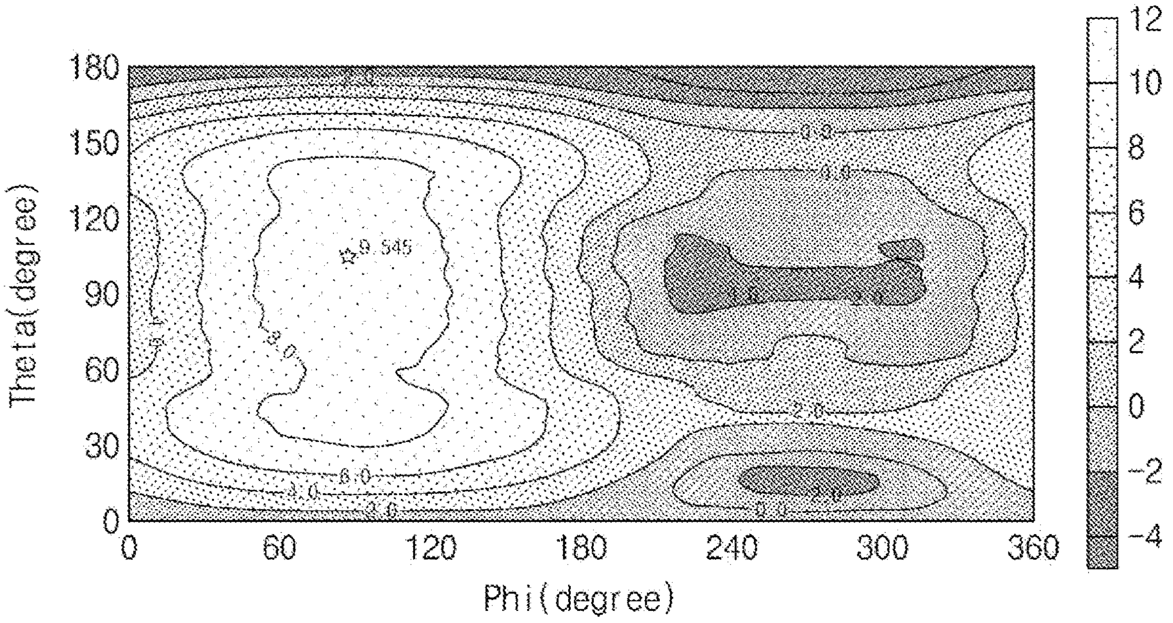
FIGS. 10A, 10B, 10C, 10D and 10E illustrate beam areas according to one or more example embodiments.

First, FIG. 10A illustrates a heat map in a beam area when the first antenna array 120 or the second antenna array 125 is independently driven (105 and 110).

Figure 10B:
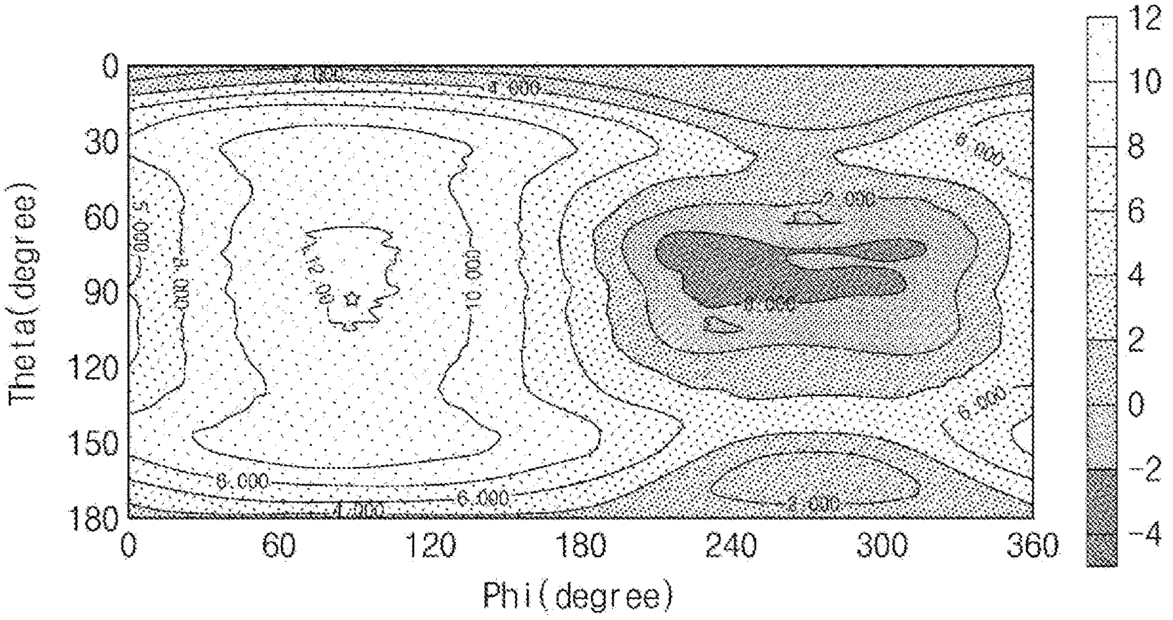

FIG. 10B illustrates a heat map in a beam area when it is driven by the third antenna array 145 having a 1×2n arrangement according to one or more example embodiments. As compared with FIG. 10A, the third antenna array 145 includes a larger number of antenna elements and. Thus, an antenna gain is enhanced in all angles (theta and phi) of the beam area.

Figure 10C:
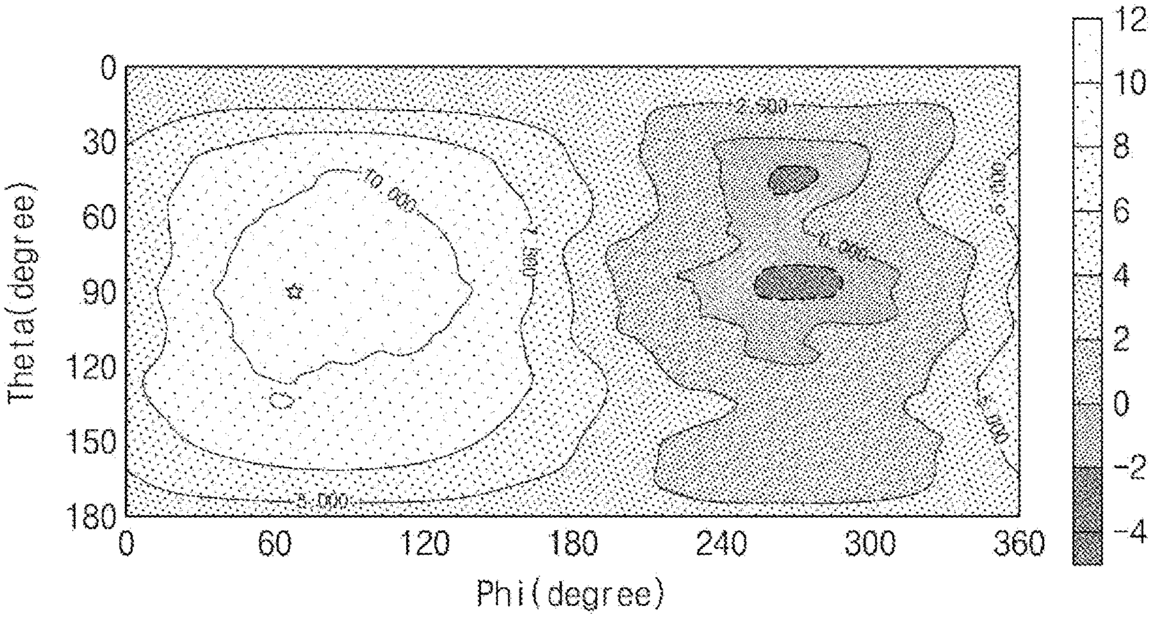
Figure 10D:
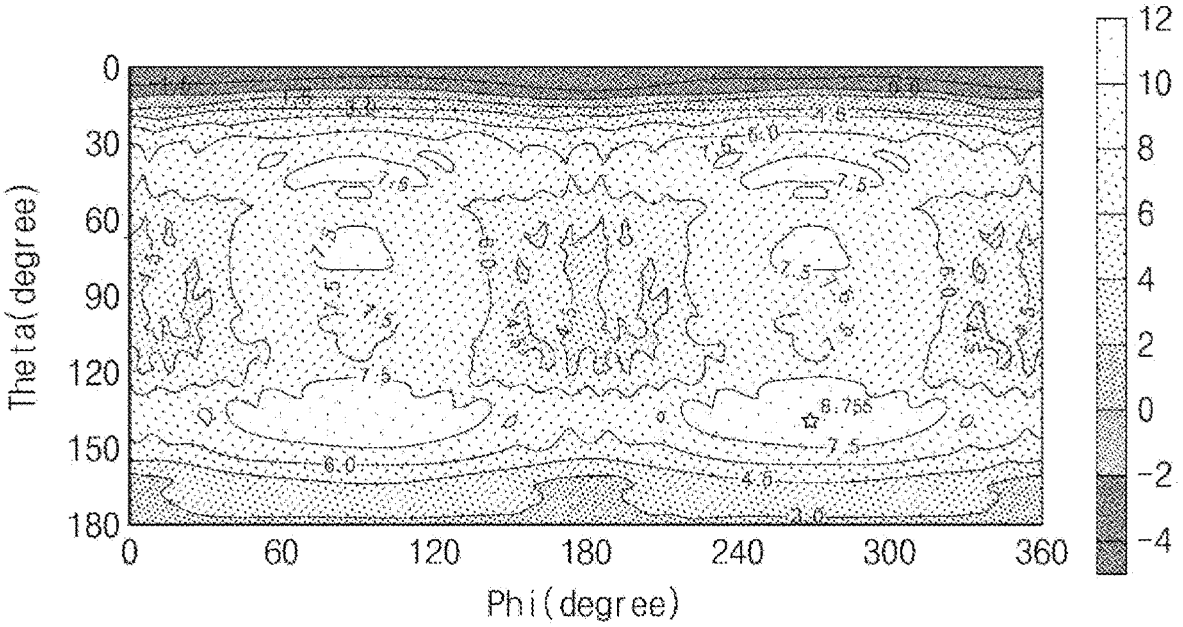

FIG. 10C illustrates a heat map of a beam area when the fourth antenna array 150 having two 1×n arrangements that may form beams in oriented directions according to one or more example embodiments, and FIG. 10D illustrates a heat map of a beam area when the first antenna array 120 and the second antenna array 125 are driven to be oriented in different directions according to one or more example embodiments. Similarly, when compared with FIG. 10A, it may be identified that a larger number of antenna elements are included when the fourth antenna array 150, the first antenna array 120, and the second antenna array 125 are driven to be oriented in different directions (300) whereby an antenna gain is enhanced in all angles (theta and phi) of the beam area.

Figure 10E:
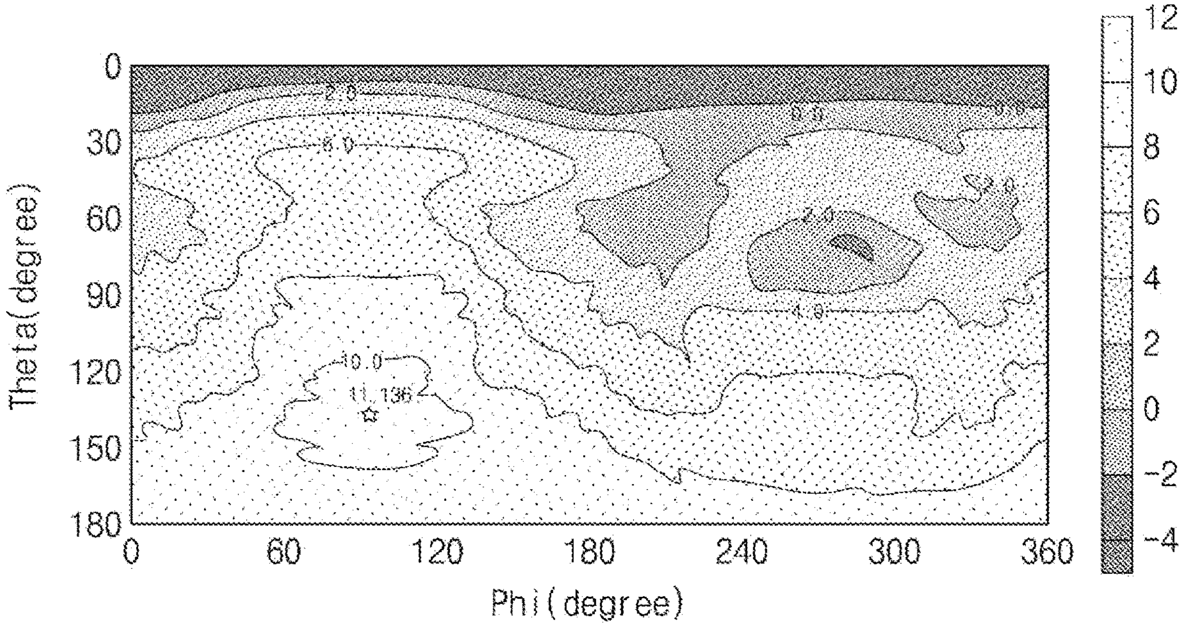

FIG. 10E illustrates a heat map when the first antenna array 120 and the second antenna array 125 are disposed on, among the side surfaces included in the housing 101, two side surfaces that are connected to each other to have a specific angle according to one or more example embodiments. Similarly, when compared with FIG. 10A, it may be identified that an antenna gain is enhanced in all angles (theta and phi) of the beam area because the antennas of the two 1×n arrangement are formed in different directions.

Figure 11:
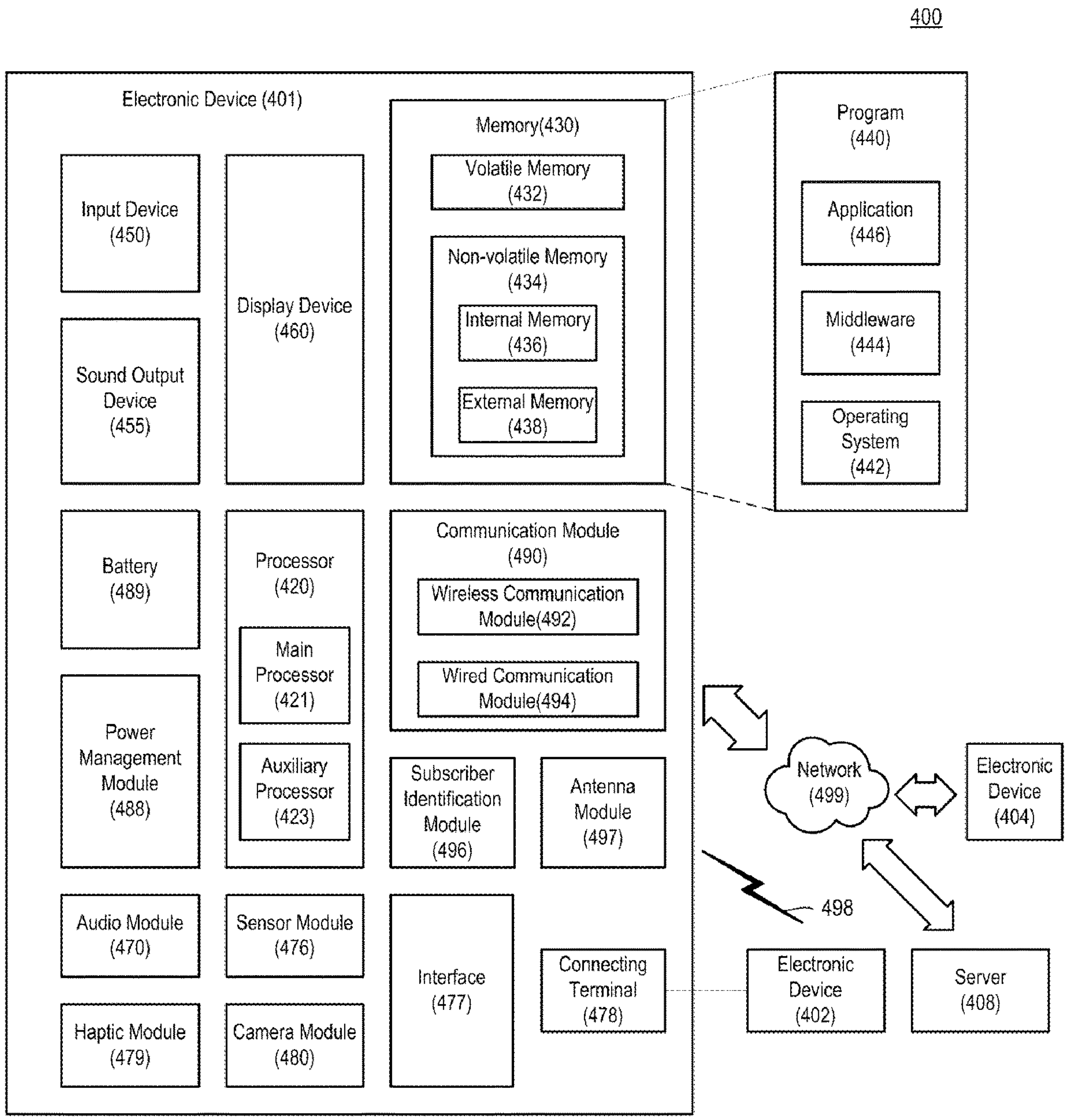
FIG. 11 is a block diagram of an electronic device in a network environment according to one or more example embodiments.

FIG. 11 is a block diagram of an electronic device in a network environment according to one or more example embodiments.

Referring to FIG. 11, an electronic device according to one or more example embodiments may communicate with an electronic device 402 through a first network 498 or may communicate with an electronic device 404 or a server 408 through a second network 499 in a network environment 400.

According to one or more example embodiments, the electronic device 401 may communicate with the electronic device 404 through the server 408. According to one or more example embodiments, the electronic device 401 may include, but is not limited to, a processor 420, a memory 430, an input device 450, a sound output device 455, a display device 460, an audio module 470, a sensor module 476, an interface 477, a haptic module 479, a camera module 480, a power management module 488, a battery 489, a communication module 490, a subscriber identification module 496, and an antenna module 497. In one or more example embodiments, at least one (e.g., the display device 460 or the camera module 480) among components of the electronic device 401 may be omitted or other components may be added to the electronic device 401. In one or more example embodiments, some components may be integrated into one integrated circuit. For example, the sensor module 476 (e.g., a fingerprint sensor, an iris sensor, or an illuminance sensor) may be embedded in the display device 460 (e.g., a display).

The processor 420 may operate, for example, software (e.g., a program 440) to control at least one of other components (e.g., a hardware component or software component) of the electronic device 401 connected to the processor 420 and may process and compute a variety of data. According to one or more example embodiments, as a part of data process and computation, the processor 420 may load a command set or data, which is received from other components (e.g., the sensor module 476 or the communication module 490), into a volatile memory 432, may process the loaded command or data, and may store result data into a nonvolatile memory 434. According to one or more example embodiments, the processor 420 may include, but is not limited to, a main processor 421 (e.g., a central processing unit or an application processor) and an auxiliary processor 423 (e.g., a graphic processing device, an image signal processor, a sensor hub processor, or a communication processor), which operates independently from the main processor 421. Additionally or alternatively, according to one or more example embodiments, the auxiliary processor 423 may use less power than the main processor 421 or is the auxiliary processor 423 may be specified to a designated function.

The auxiliary processor 423 may be implemented separately or as a part of the main processor 421 or the auxiliary processor 423 may operate separately from the main processor 421, or the auxiliary processor 423 may be embedded. For example, the auxiliary processor 423 may control, for example, at least some of functions or states associated with at least one component (e.g., the display device 460, the sensor module 476, or the communication module 490) among the components of the electronic device 401 instead of the main processor 421 while the main processor 421 is in an inactive (e.g., sleep) state or, together with the main processor 421, while the main processor 421 is in an active (e.g., an application execution) state. According to one or more example embodiments, the auxiliary processor 423 (e.g., the image signal processor or the communication processor) may be implemented as a part of another component (e.g., the camera module 480 or the communication module 490) that is functionally related to the auxiliary processor 423.

The memory 430 may store a variety of data used by at least one component (e.g., the processor 420 or the sensor module 476) of the electronic device 401. For example, data may include, but is not limited to, software (e.g., the program 440) and input data or output data with respect to commands associated with the software. The memory 430 may include, but is not limited to, the volatile memory 432, the nonvolatile memory 434, or the like.

The program 440 may be stored in the memory 430 as software and may include, but is not limited to, for example, an operating system 442, a middleware 444, an application 446, or the like. The input device 450 may receive a command or data, which is used for a component (e.g., the processor 420) of the electronic device 401, from an outside (e.g., a user) of the electronic device 401

The input device 450 may include, but is not limited to, for example, a microphone, a mouse, a keyboard, or the like.

The sound output device 455 may output a sound signal to the outside of the electronic device 401. The sound output device 455 may include, but is not limited to, for example, a speaker and a receiver. The speaker may be used for general purposes, such as multimedia play or recordings play, and a receiver may be used only for receiving calls. According to one or more example embodiments, the receiver and the speaker may be either integrally or separately implemented.

The display device 460 may be a device for visually presenting information to the user. The display device 460 may include, but is not limited to, for example, a display, a hologram device, or a projector and a control circuit for controlling a corresponding device. According to one or more example embodiments, the display device 460 may include, but is not limited to, a touch circuitry or a pressure sensor for measuring an intensity of pressure on the touch.

The audio module 470 may convert a sound and an electrical signal in dual directions. According to one or more example embodiments, the audio module 470 may obtain the sound through the input device 450 or may output the sound through an external electronic device (e.g., the electronic device 402 (e.g., a speaker or a headphone)) wired or wirelessly connected to the sound output device 455 or the electronic device 401.

The sensor module 476 may generate an electrical signal or a data value corresponding to an operating state (e.g., power or temperature) inside or an environmental state outside the electronic device 401. According to one or more example embodiments, the sensor module 476 may include, but is not limited to, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, an illuminance sensor, or the like.

The interface 477 may support a designated protocol wired or wirelessly connected to the external electronic device (e.g., the electronic device 402). According to one or more example embodiments, the interface 477 may include, but is not limited to, for example, an HDMI (high-definition multimedia interface), a USB (universal serial bus) interface, an SD card interface, an audio interface, or the like.

A connecting terminal 478 may include, but is not limited to, a connector that physically connects the electronic device 401 to the external electronic device (e.g., the electronic device 402). According to one or more example embodiments, the connecting terminal 478 may include, but is not limited to, for example, an HDMI connector, a USB connector, an SD card connector, or an audio connector (e.g., a headphone connector).

The haptic module 479 may convert an electrical signal to a mechanical stimulation (e.g., vibration or movement) or an electrical stimulation perceived by the user through tactile or kinesthetic sensations. The haptic module 479 may include, but is not limited to, for example, a motor, a piezoelectric element, an electric stimulator, or the like.

The camera module 480 may shoot a still image or a video image. According to one or more example embodiments, the camera module 480 may include, but is not limited to, for example, at least one lens, an image sensor, an image signal processor, a flash, or the like.

The power management module 488 may be a module for managing power supplied to the electronic device 401. According to one or more example embodiments, the power management module 488 may be implemented as at least a part of a power management integrated circuit (PMIC).

The battery 489 may supply power to at least one component of the electronic device 401. According to one or more example embodiments, the battery 489 may include, but is not limited to, for example, a non-rechargeable (primary) battery, a rechargeable (secondary) battery, a fuel cell, or the like.

The communication module 490 may establish a wired or wireless communication channel between the electronic device 401 and the external electronic device (e.g., the electronic device 402, the electronic device 404, or the server 408) and the communication module 490 may support communication execution through the established communication channel. The communication module 490 may include, but is not limited to, at least one communication processor operating independently from the processor 420 (e.g., the application processor) and supporting the wired communication or the wireless communication.

According to one or more example embodiments, the communication module 490 may include, but is not limited to, a wireless communication module 492 (e.g., a cellular communication module, a short-range wireless communication module, a GNSS (global navigation satellite system) communication module), a wired communication module 494 (e.g., an LAN (local area network) communication module or a power line communication module), or the like. The communication module 490 may communicate with an external electronic device using a corresponding communication module among them through the first network 498 (e.g., a short-range communication network such as a Bluetooth, a Wi-Fi direct, or an IrDA (infrared data association)) or the second network 499 (e.g., the long-distance wireless communication network such as a cellular network, an internet, or a computer network (e.g., LAN or WAN)). The communication modules 492 and 494 may be implemented by one chip or by separate chips, respectively.

According to one or more example embodiments, the wireless communication module 492 may identify and authenticate the electronic device 401 in the communication network, such as the first network 498, or the second network 499, using an International Mobile Subscriber Identity IMSI stored in the subscriber identification module 496 in the communication network.

The antenna module 497 may transmit or receive a signal or power to or from the outside (e.g., an external electronic device). The antenna module 497 may include, but is not limited to, one or more antennas. At least one antenna suitable for the communication scheme used in the communication network such as the first network 498 or the second network 499 may be selected by the communication module 490, for example. The signal and power may be transmitted or received between the communication module 490 or the external electronic device 404 through the selected antenna.

The antenna module 497 may include, but is not limited to, the antenna arrays 120, 125, 145, and 150 according to one or more example embodiments. According to one or more example embodiments, the first antenna array 120 and the second antenna array 125 may be changed to implement the third antenna array 145 and the fourth antenna array 150. The antenna module 497 may communicate with the electronic device 402 or 404 or the server 408 with the improved transmission/reception capability and the improved beam scan capability by reconfiguring the antenna array having various sizes of arrays only by using two antenna arrays 120 and 125.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to one or more example embodiments, the command or data may be transmitted or received between the electronic device 401 and the external electronic device 404 through the server 408 connected to the second network 499. Each of the electronic devices 402 and 404 may be the same or different types as the electronic device 401. According to one or more example embodiments, all or some of the operations performed by the electronic device 401 may be performed by one or more external devices among the external electronic device 402, 404, or 408. When the electronic device 401 performs some functions or services automatically or by request, the electronic device 401 may request an external electronic device to perform at least some of the functions related to the functions or services, in addition to or instead of performing the functions or services by itself. The external electronic device receiving the request may carry out the requested function or the additional function and transmit the result to the electronic device 401. The electronic device 401 may provide the requested functions or services based on the received result as is or after additionally processing the received result. To this end, for example, a cloud computing, distributed computing, client-server computing technology, or the like may be used.

According to one or more example embodiments, an electronic device including an antenna array that may be reconfigured may be provided.

The description above relates to one or more example embodiments. Designs of one or more example embodiments may changed, in addition to the above-described one or more example embodiments. Furthermore, one or more example embodiments may include technologies for carrying out the one or more example embodiments after changing one or more example embodiments.

While one or more example embodiments have been particularly shown and described above, it will be apparent to those skilled in the art that various changes in form and details may be made therein without departing from the spirit and scope of the following claims.

What is claimed is:

1. An electronic device comprising:

a first housing comprising:

a first surface; and a second surface connected to the first surface and having an area that is smaller than an area of the first surface;

a second housing comprising:

a third surface; and a fourth surface connected to the third surface and having an area that is smaller than an area of the third surface;

a hinge structure connecting the first housing and the second housing to be foldable relative to each other at a folding axis, between a folded state of the electronic device and an unfolded state of the electronic device;

a first antenna array provided at the second surface;

a second antenna array provided at the fourth surface; and a flexible board connecting the first antenna array and the second antenna array, wherein the first antenna array and the second antenna array are configured to form a third antenna array and to form a fourth antenna array, according to whether the electronic device is in the unfolded state or in the folded state.

2. The electronic device of claim 1, wherein the first antenna array and the second antenna array are configured to form the third antenna array when the electronic device is in the unfolded state, and wherein the first antenna array and the second antenna array are configured to form the fourth antenna array when the electronic device is in the folded state.

3. The electronic device of claim 1, wherein, when the electronic device is in the unfolded state, the first antenna array and the second antenna array are arranged along an axis that is perpendicular to the folding axis to form the third antenna array.

4. The electronic device of claim 1, wherein, when the electronic device is in the folded state, the first antenna array and the second antenna array are arranged along an axis that is perpendicular to the folding axis to form the fourth antenna array.

5. The electronic device of claim 1, wherein the first antenna array and the second antenna array have a 1×n arrangement, where n is a natural number.

6. The electronic device of claim 5, wherein the third antenna array has a 1×2n arrangement.

7. The electronic device of claim 5, wherein the fourth antenna array has a 2×n arrangement.

8. The electronic device of claim 1, wherein the flexible board connects a first side surface of the first antenna array and a second side surface of the second antenna array, and wherein the first side surface of the first antenna array and the second side surface of the second antenna array correspond to each other when the electronic device is in the unfolded state.

9. An electronic device comprising:

an antenna structure; and a communication circuit electrically connected to the antenna structure, wherein the antenna structure includes:

a first housing comprising:

a first surface; and a second surface connected to the first surface;

a second housing comprising:

a third surface; and a fourth surface connected to the third surface;

a hinge structure connecting the first housing and the second housing to be foldable relative to each other at a folding axis, between a folded state of the electronic device and an unfolded state of the electronic device;

a first antenna array provided at the second surface;

a second antenna array provided at the fourth surface; and a flexible board connecting the first antenna array and the second antenna array, and wherein the first antenna array and the second antenna array are configured to form a third antenna array and to form a fourth antenna array according to whether the electronic device is in the unfolded state or in the folded state.

10. The electronic device of claim 9, wherein the communication circuit is configured to operate at least one of the first antenna array and the second antenna array.

11. The electronic device of claim 9, wherein the communication circuit is provided on a surface of any one of the first antenna array and the second antenna array.

12. The electronic device of claim 9, wherein the communication circuit is configured to:

steer a beam formed from the third antenna array along an axis that is perpendicular to the folding axis when the electronic device is in the unfolded state; and steer a beam formed from the fourth antenna array along the axis that is perpendicular to the folding axis when the electronic device is in the folded state.

13. The electronic device of claim 9, wherein the communication circuit is configured to:

steer a beam formed from the third antenna array along the folding axis or an axis that is perpendicular to the folding axis when the electronic device is in the unfolded state; and steer a beam formed from the first antenna array and a beam formed from the second antenna array along the folding axis when the electronic device is in the folded state.

14. The electronic device of claim 9, wherein the flexible board connects a side surface of the second surface and a side surface of the fourth surface, and wherein the communication circuit is provided on a surface opposite to the second surface or the fourth surface.

* * * * *